(12) United States Patent
Ota et al.

(10) Patent No.: US 10,267,414 B2
(45) Date of Patent: Apr. 23, 2019

(54) CONTROLLER FOR AUTOMATIC TRANSMISSION

(71) Applicant: TOYOTA JIDOSHA KABUSHIKI KAISHA, Toyota-shi, Aichi-ken (JP)

(72) Inventors: Keisuke Ota, Toyota (JP); Norihiro Tsukamoto, Toyota (JP); Ayumu Sagawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 3 days.

(21) Appl. No.: 15/651,360

(22) Filed: Jul. 17, 2017

(65) Prior Publication Data

US 2018/0023696 A1    Jan. 25, 2018

(30) Foreign Application Priority Data

Jul. 20, 2016 (JP) .................................. 2016-142303

(51) Int. Cl.
| | |
|---|---|
| *F16H 61/02* | (2006.01) |
| *F16H 61/04* | (2006.01) |
| *F16H 61/682* | (2006.01) |
| *F16H 3/66* | (2006.01) |

(52) U.S. Cl.
CPC ......... *F16H 61/04* (2013.01); *F16H 61/0213* (2013.01); *F16H 61/0437* (2013.01); *F16H 61/682* (2013.01); *F16H 3/666* (2013.01); *F16H 2061/0444* (2013.01); *F16H 2200/006* (2013.01); *F16H 2200/201* (2013.01); *F16H 2200/2046* (2013.01); *F16H 2200/2097* (2013.01); *F16H 2306/14* (2013.01)

(58) Field of Classification Search
CPC .. F16H 61/04; F16H 61/0437; F16H 61/0213; F16H 61/682; F16H 2061/0444; F16H 2306/14; F16H 2200/201; F16H 2200/2046; F16H 2200/2097; F16H 3/666; F16H 2200/006
See application file for complete search history.

(56) References Cited

U.S. PATENT DOCUMENTS

| | | | |
|---|---|---|---|
| 2002/0147071 A1 | 10/2002 | Hayabuchi et al. | |
| 2005/0197234 A1* | 9/2005 | Reuschel | F16H 61/04 477/41 |
| 2007/0137340 A1* | 6/2007 | Lubke | F16H 63/18 74/337.5 |

(Continued)

FOREIGN PATENT DOCUMENTS

JP    2002-310281 A    10/2002

*Primary Examiner* — David J Hlavka
(74) *Attorney, Agent, or Firm* — Oliff PLC

(57) ABSTRACT

In a controller for an automatic transmission, when a jump gear shift via a plurality of intermediate shift stages is executed, a first and a second target intermediate shift stages are extracted, and a target input shaft rotation speed change rate is calculated from a difference in synchronous rotation speed between a shift stage before a current gear shift and the second target intermediate shift stage as a target shift stage of a gear shift which is executed after the current gear shift. Accordingly, it is possible to avoid a situation in which a shifting time in the gear shift control of the step before the second target intermediate shift stage becomes very short and thus packing of a clutch pack is not executed in a timely manner.

4 Claims, 6 Drawing Sheets

(56) References Cited

U.S. PATENT DOCUMENTS

2016/0290497 A1* 10/2016 Nakamura .......... F16H 61/0213
2016/0298735 A1* 10/2016 Maeda .................... F16H 3/663
2017/0002923 A1*  1/2017 Kim ........................ F16H 3/663

* cited by examiner

FIG. 3

|  | C1 | C2 | C3 | C4 | B1 | B2 |
|---|---|---|---|---|---|---|
| 1st | ○ |  |  |  |  | ○ |
| 2nd | ○ |  |  |  | ○ |  |
| 3rd | ○ |  | ○ |  |  |  |
| 4th | ○ |  |  | ○ |  |  |
| 5th | ○ | ○ |  |  |  |  |
| 6th |  | ○ |  | ○ |  |  |
| 7th |  | ○ | ○ |  |  |  |
| 8th |  | ○ |  |  | ○ |  |
| Rev |  |  | ○ |  |  | ○ |

CONTROLLER FOR AUTOMATIC TRANSMISSION

CROSS-REFERENCE TO RELATED APPLICATIONS

This application claims priority to Japanese Patent Application No. 2016-142303 filed on Jul. 20, 2016, which is incorporated herein by reference in its entirety.

BACKGROUND

1. Technical Field

The disclosure relates to a controller for an automatic transmission. Particularly, the disclosure relates to gear shift control when a gear shift via an intermediate shift stage is executed in a stepped type automatic transmission.

2. Description of Related Art

With a recent increase in the number of shift stages of an automatic transmission, a gear shift of the automatic transmission has more often been executed by a jump gear shift (for example, a gear shift from a current shift stage to a shift stage lower by two or more steps at a power-on downshift time or the like).

When such a jump gear shift is executed, there is a likelihood that a variation in rotation speed of frictional engagement elements due to engagement and disengagement of the frictional engagement elements will increase and a quantity of heat generated due to sliding of friction materials between the frictional engagement elements (hereinafter also referred to as a clutch heat quantity) will increase. Therefore, in order to decrease the clutch heat quantity, the gear shift is executed via another shift stage (hereinafter also referred to as an intermediate shift stage) between a shift stage before the gear shift and a required shift stage which is required depending on driving conditions such as an accelerator depression amount.

Specifically, when a gear shift from an eighth shift stage to a second shift stage is executed as an example of a jump downshift, there is a likelihood that the clutch heat quantity will increase and durability of the frictional engagement elements will not be guaranteed simply by executing a direct jump gear shift (a single jump gear shift) from the eighth shift stage to the second shift stage. In addition, there is room for improvement in that a variation in driving force at a gear shift end time or at a second shift stage synchronization time increases. Accordingly, it is conceivable that the gear shift is executed via a fifth shift stage as an intermediate shift stage between the eighth shift stage and the second shift stage. In this case, when there is concern that the clutch heat quantity will increase at the time of the gear shift from the fifth shift stage to the second shift stage, it is conceivable that the gear shift is executed via a third shift stage as an additional intermediate shift stage between the fifth shift stage and the second shift stage. That is, by executing the gear shift sequentially from the eighth shift stage to the second shift stage via the fifth shift stage and the third shift stage, that is, by executing the gear shift via a plurality of intermediate shift stages, durability of the frictional engagement elements can be guaranteed and the variation in driving force can be decreased, thereby improving drivability.

Japanese Patent Application Publication No. 2002-310281 (JP 2002-310281 A) discloses a technique of executing a jump downshift via a plurality of intermediate shift stages as described above.

SUMMARY

In this way, when a jump gear shift via a plurality of intermediate shift stages is executed, an execution time for gear shift control from a first intermediate shift stage to a second intermediate shift stage is likely to decrease. At a gear shift control time before the gear shift to the second intermediate shift stage is started (at a time of gear shift control from the eighth shift stage to the fifth shift stage before the gear shift to the third shift stage is started in the above-mentioned example: this control is hereinafter referred to as first gear shift control), when a shifting time in the first gear shift control is very short, there is concern that packing of a clutch pack which is realized by supplying a hydraulic oil to a hydraulic oil pressure chamber of the frictional engagement elements which are engaged when the second intermediate shift stage (the third shift stage in the above-mentioned example) is set thereafter will not be executed in a timely manner and smooth gear shift will not be realized.

The inventor et al. of the disclosure have noticed that it is necessary to appropriately manage a time required for preparation for engagement of engagement-side frictional engagement elements in order to realize a desired clutch torque in the frictional engagement elements at a synchronous rotation speed of each shift stage (a synchronous rotation speed of an input shaft of an automatic transmission) when a jump gear shift via a plurality of intermediate shift stages is executed. The inventor et al. have found that this time could be managed using a change per unit time of a rotation speed (an input shaft rotation speed change rate (a rotationally angular accelerator)) of the input shaft (a rotational angular velocity of the input shaft) of the automatic transmission.

The disclosure is made in consideration of the above-mentioned circumstances and provides a controller for an automatic transmission that can appropriately manage a time required for preparation for engagement of frictional engagement elements in a jump gear shift via a plurality of intermediate shift stages.

According to an aspect of the disclosure, there is provided a controller for an automatic transmission. The automatic transmission: (i) is a stepped type automatic transmission, (ii) sets one of a plurality of shift stages by selectively causing a plurality of frictional engagement elements to engage with each other, and (iii) is able to execute a jump gear shift of jumping over two or more shift stages when a shift stage difference of two or more stages occurs between a current shift stage and a required shift stage which is required depending on a driving condition. The controller includes an electronic control unit. The electronic control unit is configured to: (i) set a target input shaft rotation speed change rate as a control target value at a gear shift time; and (ii) set the target input shaft rotation speed change rate of a two-step gear shift based on a difference in synchronous rotation speed of an input shaft of the automatic transmission between before and after the two-step gear shift from a gear shift with an intermediate shift stage as a target shift stage to a gear shift with a next shift stage after the intermediate shift stage as a target shift stage for each intermediate shift stage when a shift stage difference of three or more shift stages occurs between the current shift stage and the required shift stage and the jump gear shift via a plurality of intermediate shift stages is executed.

According to the above-mentioned controller for an automatic transmission, in the automatic transmission, it is possible to appropriately set the input shaft rotation speed change rate for each gear shift of two steps and to execute the gear shift while guaranteeing an engagement preparation time for the frictional engagement elements.

In the controller for an automatic transmission, the electronic control unit may be configured to: when the electronic control unit executes a jump downshift as the jump gear shift via a plurality of intermediate shift stages, (i) extract one shift stage as a first target shift stage among the shift stages which are lower (larger in gear ratio) than the current shift stage and equal to or higher than the required shift stage, the one shift stage being able to be achieved by replacement of a pair of frictional engagement elements when the shift stage is shifted from the current shift stage, and a difference in a rotation speed of the input shaft between before and after the gear shift which is assumed to be executed is equal to or less than a first predetermined threshold value; (ii) extract another shift stage as a second target shift stage among the shift stages which are lower than the first target shift stage and equal to or higher than the required shift stage, the another shift stage being able to be achieved by replacement of the pair of frictional engagement elements when the shift stage is shifted from the first target shift stage, and a difference in rotation speed of the input shaft between before and after the gear shift which is assumed to be executed is equal to or less than a second predetermined threshold value; and (iii) set the target input shaft rotation speed change rate of the two-step gear shift based on the difference in the synchronous rotation speed of the input shaft between before and after the two-step gear shift from the gear shift with the first target shift stage as a target to the gear shift with the second target shift stage as a target.

According to the above-mentioned controller, in the automatic transmission, it is possible to enable a gear shift by replacement of a pair of frictional engagement elements for each gear shift of two steps and to reduce a heat quantity generated with the replacement of the frictional engagement elements (a clutch heat quantity). Accordingly, it is possible to guarantee durability of the frictional engagement elements and to realize a smooth gear shift operation by securing an engagement preparation time of the frictional engagement elements.

In the controller, the electronic control unit may be configured to set the target input shaft rotation speed change rate to be lower as a time required for packing of a clutch pack becomes longer, the packing of the clutch of the clutch pack being realized by supplying a hydraulic oil to a hydraulic oil pressure chamber of the frictional engagement element which is on an engagement side of the frictional engagement elements when the target shift stage of the latter gear shift in the two-step gear shift is achieved.

When the target input shaft rotation speed change rate is fixed, as the time required for the packing becomes longer, the shifting time becomes shorter than the time required for the packing and the likelihood that the packing with the hydraulic oil will not be executed in a timely manner becomes higher. According to the above-mentioned controller for an automatic transmission, as the time required for the packing becomes longer, the target input shaft rotation speed change rate is set to be lower. Accordingly, it is possible to prevent the shifting time in the gear shift control to the former gear shift in the two-step gear shift from being very short. As a result, it is possible to avoid a situation in which the packing with the hydraulic oil of the hydraulic oil pressure chamber of the frictional engagement elements serving as the engagement side when the target shift stage in the gear shift to the latter gear shift is set is not executed in a timely manner. Accordingly, it is possible to realize a smooth gear shift operation.

In the controller, the electronic control unit may be configured to set the target input shaft rotation speed change rate to be lower as the difference in synchronous rotation speed of the input shaft between before and after the two-step gear shift becomes smaller.

When the target input shaft rotation speed change rate is constant, as the difference in synchronous rotation speed of the input shaft between before and after the two-step gear shift becomes smaller, the shifting time becomes shorter than the time required for the packing and the likelihood that the packing with the hydraulic oil will not be executed in a timely manner becomes higher. According to the above-mentioned controller for an automatic transmission, as the difference in synchronous rotation speed of the input shaft between before and after the two-step gear shift becomes smaller, the target input shaft rotation speed change rate is set to be lower. Accordingly, it is possible to prevent the shifting time in the gear shift control to the former gear shift in the two-step gear shift from being very short and to avoid a situation in which the packing with the hydraulic oil of the hydraulic oil pressure chamber of the frictional engagement elements serving as the engagement side when the target shift stage in the gear shift to the latter gear shift is set is not executed in a timely manner.

In the disclosure, when a jump gear shift via a plurality of intermediate shift stages is executed, the target input shaft rotation speed change rate of a two-step gear shift is set based on the difference in synchronous rotation speed of the input shaft between before and after the two-step gear shift from a gear shift with an intermediate shift stage as a target shift stage to a gear shift with a shift stage, which is a next target after the intermediate shift stage, as a target shift stage. Accordingly, in comparison with a case in which the target input shaft rotation speed change rate is set based on a difference in synchronous rotation speed of the input shaft between before and after the gear shift between the current shift stage and the required shift stage, it is possible to extend the time until reaching the synchronous rotation speed in a next target shift stage after an intermediate shift stage and to execute the gear shifts while guaranteeing the engagement preparation time for the frictional engagement elements.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 3 is an engagement table illustrating engagement states of first to fourth clutches, a first brake, and a second brake for each shift stage in the automatic transmission;

DETAILED DESCRIPTION OF EMBODIMENTS

Hereinafter, embodiments of the disclosure will be described with reference to the accompanying drawings.

First, a vehicle 100 according to an embodiment will be described below with reference to FIGS. 1 to 4.

Figure 1:
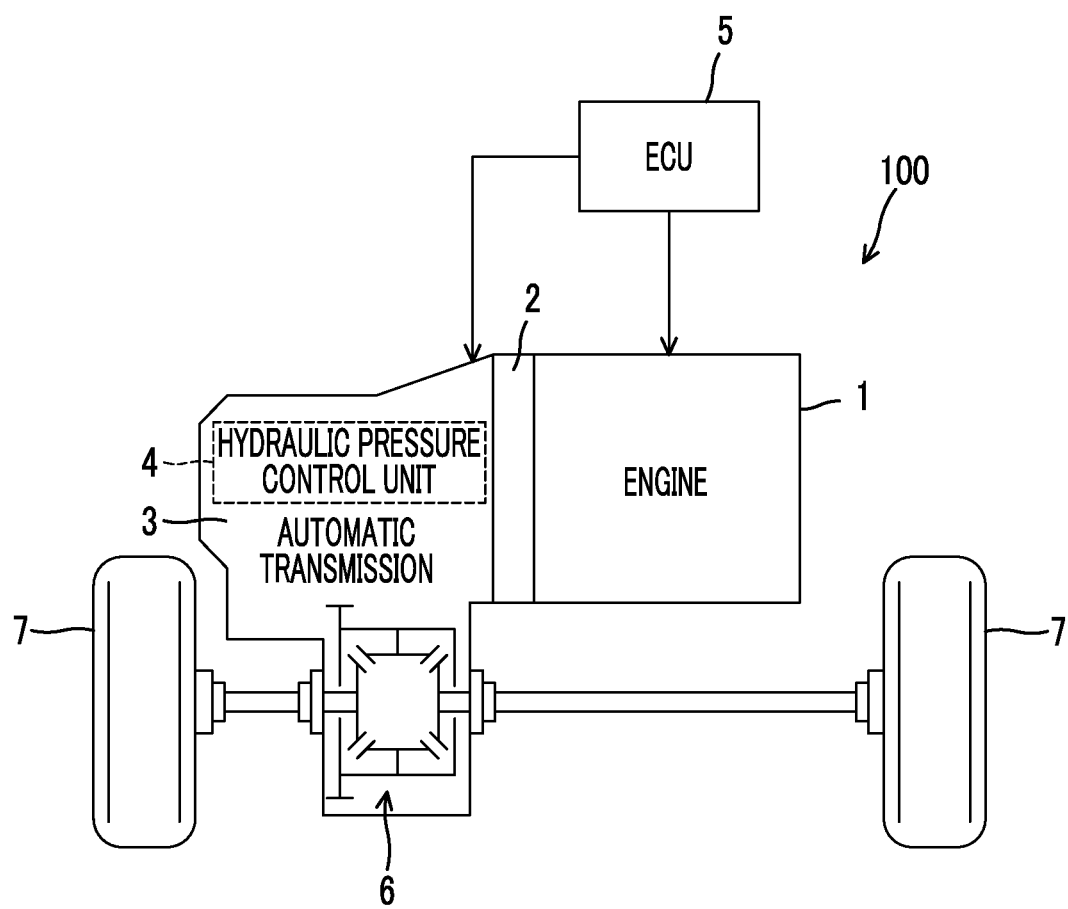
FIG. 1 is a diagram schematically illustrating a configuration of a drive system of a vehicle according to an embodiment of the disclosure.

As illustrated in FIG. 1, the vehicle 100 includes an engine 1, a torque converter 2, an automatic transmission 3, a hydraulic pressure control unit 4, and an electronic control unit (ECU) 5. The vehicle 100 is, for example, of a front engine-front drive (FF) type and is configured such that an output of the engine 1 is transmitted to a differential device 6 via the torque converter 2 and the automatic transmission 3 and is assigned to right and left driving wheels (front wheels) 7.

The engine (internal combustion engine) 1 is a driving force source for traveling and is, for example, a multi-cylinder gasoline engine. The engine 1 is configured such that an operation state thereof can be controlled based on a throttle opening level (an amount of intake air) of a throttle valve, an amount of fuel injected, an ignition timing, and the like.

Figure 2:
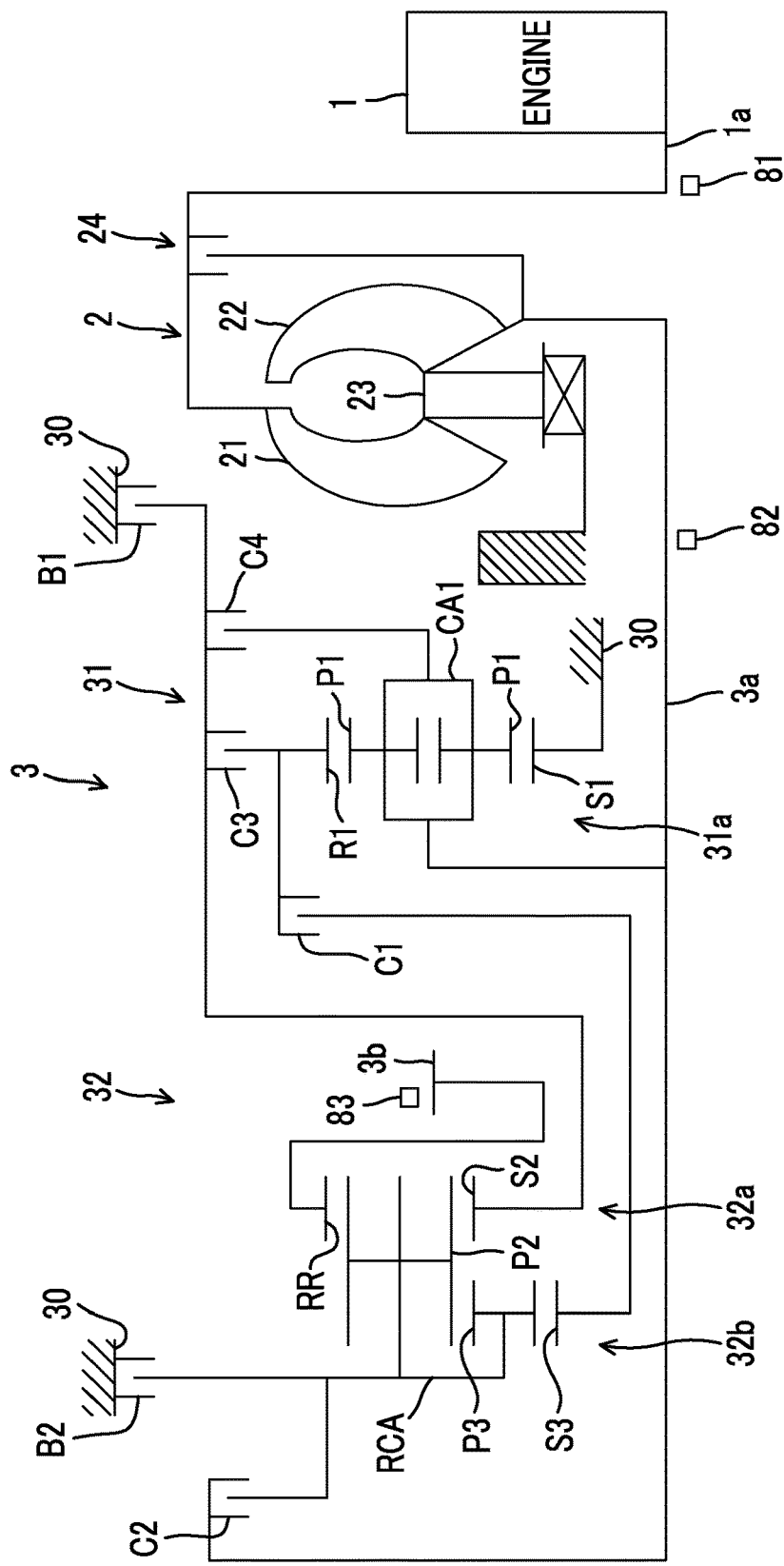
FIG. 2 is a skeleton diagram illustrating a configuration of a torque converter and an automatic transmission illustrated in FIG. 1.

As illustrated in FIG. 2, the torque converter 2 includes a pump impeller 21 that is connected to a crank shaft 1a which is an output shaft of the engine 1, a turbine runner 22 that is connected to the automatic transmission 3, a stator 23 that has a torque amplifying function, and a lock-up clutch 24 that directly connects the engine 1 and the automatic transmission 3 to each other. In FIG. 2, a lower half below a rotation axis of the torque converter 2 and the automatic transmission 3 is omitted and only an upper half is schematically illustrated.

The automatic transmission 3 is disposed in a power transmission path between the engine 1 and the driving wheels 7 and is configured to change a rotation speed of an input shaft 3a and to output the changed rotation speed to an output shaft 3b. In the automatic transmission 3, the input shaft 3a is connected to the turbine runner 22 of the torque converter 2, and the output shaft 3b is connected to the driving wheels 7 via the differential device 6 or the like.

The automatic transmission 3 includes a first gear shift unit (a front planetary) 31 that includes a first planetary gear mechanism 31a as a main element, a second gear shift unit (a rear planetary) 32 that includes a second planetary gear mechanism 32a and a third planetary gear mechanism 32b as a main element, first to fourth clutches C1 to C4, a first brake B1, and a second brake B2.

The first planetary gear mechanism 31a constituting the first gear shift unit 31 is a double pinion type planetary gear mechanism and includes a sun gear S1, a plurality of pairs of pinion gears P1 that are engaged with each other, a planetary carrier CA1 that supports the pinion gears P1 such that they can rotate and revolve, and a ring gear R1 that engages with the sun gear S1 via the pinion gears P1.

The planetary carrier CA1 is connected to the input shaft 3a and integrally rotates along with the input shaft 3a. The sun gear S1 is fixed to a transmission case 30 and is not rotatable. The ring gear R1 serves as an intermediate output member and reduces the rotation speed of the input shaft 3a and transmits the reduced rotation speed to the second gear shift unit 32.

The second planetary gear mechanism 32a constituting the second gear shift unit 32 is a single pinion type planetary gear mechanism and includes a sun gear S2, a pinion gear P2, a planetary carrier RCA that supports the pinion gear P2 such that it can rotate and revolve, and a ring gear RR that engages with the sun gear S2 via the pinion gear P2.

The third planetary gear mechanism 32b constituting the second gear shift unit 32 is a double pinion type planetary gear mechanism and includes a sun gear S3, a plurality of pairs of pinion gears P2 and P3 that are engaged with each other, a planetary carrier RCA that supports the pinion gears P2 and P3 such that they can rotate and revolve, and a ring gear RR that engages with the sun gear S3 via the pinion gears P2 and P3. The planetary carrier RCA and the ring gear RR are shared by the second planetary gear mechanism 32a and the third planetary gear mechanism 32b.

The sun gear S2 is selectively connected to the transmission case 30 by the first brake B1. The sun gear S2 is selectively connected to the ring gear R1 via the third clutch C3. The sun gear S2 is further selectively connected to the planetary carrier CA1 via the fourth clutch C4. The sun gear S3 is selectively connected to the ring gear R1 via the first clutch C1. The planetary carrier RCA is selectively connected to the transmission case 30 by the second brake B2. The planetary carrier RCA is selectively connected to the input shaft 3a via the second clutch C2. The ring gear RR is connected to the output shaft 3b and integrally rotates along with the output shaft 3b.

The first to fourth clutches C1 to C4, the first brake B1, and the second brake B2 are frictional engagement elements that are engaged frictionally by a hydraulic actuator and are controlled by the hydraulic pressure control unit 4 and the ECU 5.

FIG. 3 is an engagement table illustrating engaged states or disengaged states of the first to fourth clutches C1 to C4, the first brake B1, and the second brake B2 for each shift stage (each gear stage). In the engagement table illustrated in FIG. 3, mark O denotes an "engaged state" and a blank denotes a "disengaged state."

As illustrated in FIG. 3, in the automatic transmission 3 according to this embodiment, the first clutch C1 and the second brake B2 each engage to set a first shift stage (1st) having a largest gear ratio (the rotation speed of the input shaft 3a/the rotation speed of the output shaft 3b). The first clutch C1 and the first brake B1 each engage to set a second shift stage (2nd).

The first clutch C1 and the third clutch C3 each engage to set a third shift stage (3rd). The first clutch C1 and the fourth clutch C4 each engage to set a fourth shift stage (4th). The first clutch C1 and the second clutch C2 each engage to set a fifth shift stage (5th). The second clutch C2 and the fourth clutch C4 each engage to set a sixth shift stage (6th). The second clutch C2 and the third clutch C3 each engage to set a seventh shift stage (7th). The second clutch C2 and the first brake B1 each engage to set an eighth shift stage (8th). The third clutch C3 and the second brake B2 each engage to set a reverse shift stage (Rev).

In this way, the automatic transmission 3 sets one of a plurality of shift stages by selectively causing a plurality of frictional engagement elements to engage.

The hydraulic pressure control unit 4 is provided to control states (an engaged state or a disengaged state) of the frictional engagement elements of the automatic transmission 3. The hydraulic pressure control unit 4 also has a function of controlling the lock-up clutch 24 of the torque converter 2.

Figure 4:
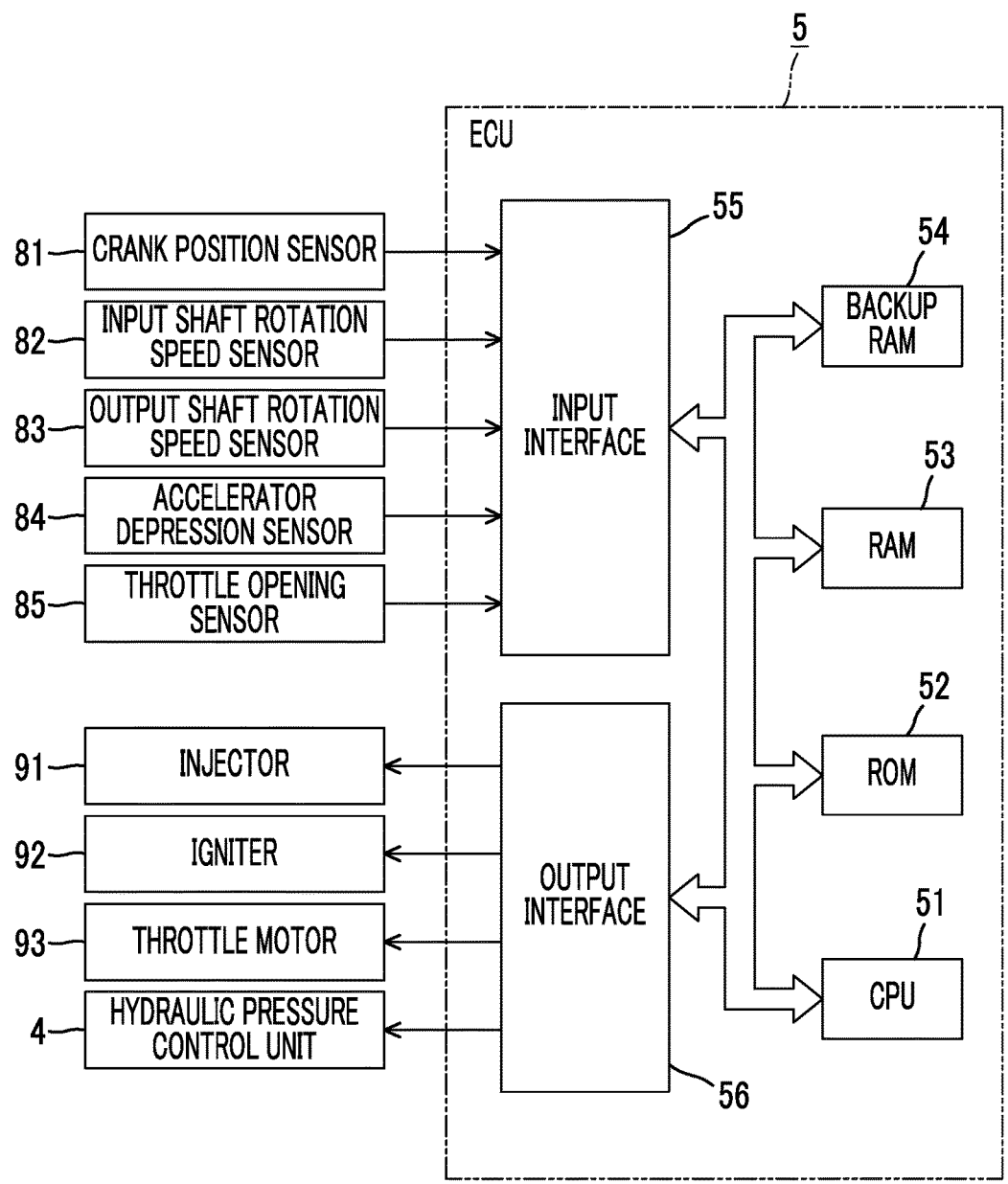
FIG. 4 is a block diagram illustrating a configuration of a control system of the vehicle.

The ECU 5 is configured to perform operation control of the engine 1, gear shift control of the automatic transmission 3, and the like. Specifically, as illustrated in FIG. 4, the ECU 5 includes a CPU 51, a ROM 52, a RAM 53, a backup RAM 54, an input interface 55, and an output interface 56. The ECU 5 is an example of the "electronic control unit" in the claims.

The CPU 51 performs an arithmetic process based on various control programs or maps stored in the ROM 52. In the ROM 52, various control programs, maps which are referred to when the control programs are executed, and the like are stored. The RAM 53 is a memory that temporarily stores process results of the CPU 51, detection results of various sensors, and the like. The backup RAM 54 is a nonvolatile memory that stores data to be stored when the ignition is turned off.

The input interface 55 is connected to a crank position sensor 81, an input shaft rotation speed sensor 82, an output shaft rotation speed sensor 83, an accelerator depression sensor 84, a throttle opening sensor 85, and the like. The crank position sensor 81 is provided to calculate a rotation speed of the engine 1. The input shaft rotation speed sensor 82 is provided to calculate a rotation speed of the input shaft 3a (a turbine rotation speed) of the automatic transmission 3. The output shaft rotation speed sensor 83 is provided to calculate a rotation speed of the output shaft 3b of the automatic transmission 3. A vehicle speed can be calculated from the rotation speed of the output shaft 3b. The accelerator depression sensor 84 is provided to detect an accelerator depression amount which is a depression amount (an operation amount) of an accelerator pedal. The throttle opening sensor 85 is provided to detect a throttle opening level of a throttle valve.

The output interface 56 is connected to an injector 91, an igniter 92, a throttle motor 93, the hydraulic pressure control unit 4, and the like. The injector 91 is a fuel injection valve and an amount of fuel injected therefrom can be adjusted. The igniter 92 is provided to adjust an ignition timing using an ignition plug. The throttle motor 93 is provided to adjust the throttle opening level of the throttle valve.

The ECU 5 is configured to control the operation state of the engine 1 by controlling the throttle opening level, the amount of fuel injected, the ignition timing, and the like based on the detection results of various sensors and the like. The ECU 5 is configured to perform gear shift control of the automatic transmission 3 and control of the lock-up clutch 24 of the torque converter 2 by controlling the hydraulic pressure control unit 4.

In the gear shift control by the ECU 5, a required shift stage is set, for example, based on a gear shift map with the vehicle speed and the accelerator depression amount as parameters, and the hydraulic pressure control unit 4 is controlled such that an actual shift stage is the required shift stage.

Before describing an operation of setting a target input shaft rotation speed change rate by which this embodiment is characterized, gear shift control for determining a control operation amount by which a gear shift target value (a control target value at the time of a gear shift in the claims) is realized in the automatic transmission 3 will be schematically described below.

As general gear shift control, for example, a technique of determining a torque capacity (or a hydraulic pressure command value) of each frictional engagement element at a gear shift time and executing a gear shift based on a predetermined control map which has been determined in advance by adaptation while evaluating whether a gear shift shock, a shifting time, or the like is appropriate in an actual vehicle is known. In the technique using the control map, it is necessary to prepare a plurality of control maps depending on a gear shift pattern of a power-on downshift, a power-off upshift, or the like and a combination of shift stages between before and after the gear shift. Accordingly greater labor is required for adaptation work as the number of shift stages of the automatic transmission becomes larger.

Therefore, in this embodiment, a technique of executing a gear shift using a gear shift model for determining a control operation amount by which the gear shift target value is realized is employed as the gear shift control instead of the technique using the control map. The gear shift target value is a target value of a factor (such as a shifting time or a driving force) for determining a change mode to be realized at the time of a gear shift. The control operation amount is a value required during operation for a factor (such as an engine torque or a clutch torque) to reach a control target.

The gear shift control using a gear shift model will be described below. Equations of motion during the gear shift are expressed by Equations (1) and (2).

$$d\omega t/dt = a1 \cdot Tt + b1 \cdot Tcapl + c1 \cdot Tcdrn + d1 \cdot d\omega o/dt \tag{1}$$

$$To = a2 \cdot Tt + b2 \cdot Tcapl + c2 \cdot Tcdrn + d2 \cdot d\omega o/dt \tag{2}$$

Equations (1) and (2) are derived from equations of motion of connected rotary elements constituting the automatic transmission 3 and relational expressions of the planetary gear mechanisms constituting the automatic transmission 3. The equation of motion of each rotary element is an equation of motion in which a torque which is expressed by a product of a moment of inertia and a change rate of a rotation speed in each rotary element is defined by a torque acting on a member associated with the rotary element among three members of the planetary gear mechanism and both members of each frictional engagement element. The relational expressions in the planetary gear mechanism are relational expressions in which a torque relationship between three members and a relationship in rotation speed change rate in the planetary gear mechanism are defined using a gear ratio of the planetary gear mechanism.

In Equations (1) and (2), $d\omega t/dt$ is a derivative with respect to time, that is, a change rate, of a turbine rotation speed (a rotational angular velocity) $\omega t$ (that is, an input shaft rotation speed $\omega i$ of the automatic transmission) and denotes an acceleration of the input shaft 3a (an angular acceleration which is hereinafter referred to as an input shaft acceleration) as a change in speed of a rotary member on the input shaft 3a side. The input shaft acceleration $d\omega t/dt$ corresponds to the input shaft rotation speed change rate in the claims. $d\omega o/dt$ is a change rate of an output shaft rotation speed $\omega o$ of the automatic transmission and denotes an output shaft acceleration. Tt denotes a turbine torque which is a torque on the input shaft 3a as a torque on a rotary member on the input shaft 3a side, that is, a transmission input torque Ti. The turbine torque Tt has the same meaning as an engine torque Te (=Tt/t) in consideration of a torque ratio t of the torque converter 2. To denotes a transmission output torque which is a torque on the output shaft 3b as a torque on a rotary member on the output shaft 3b side. Tcapl denotes a torque capacity of a frictional engagement element that performs an engagement operation at the gear shift time (hereinafter referred to as an engagement-side clutch torque). Tcdrn denotes a torque capacity of a frictional engagement element that performs a disengagement operation at the gear shift time (hereinafter referred to as a disengagement-side clutch torque). Here, a1, a2, b1, b2, c1, c2, d1, and d2 are constants when Equations (1) and (2) are derived and are coefficients which are determined in design from the moment of inertia of each rotary element and the gear ratio of the planetary gear mechanism. Specific numerical values of the constants vary, for example, depending on a gear shift type (for example, a gear shift pattern or a combination of shift stages between before and after the gear shift). Accordingly, an equation of motion is individual, but equations of motion corresponding to gear shift types in which the constants differ depending on the gear shift type are used for the gear shift of the automatic transmission 3.

Equations (1) and (2) are gear train equations of motion of the automatic transmission 3 which are obtained by formularizing a relationship between the gear shift target values and the control operation amounts. The gear shift target values can express target values for the shifting time and the driving force and are handled in the gear train equations of motion. In this embodiment, the input shaft acceleration dωt/dt is used as an example of a physical quantity that can express the shifting time. The transmission output torque To is used as an example of a physical quantity that can express the driving force. In this embodiment, the gear shift target values are set to two values which are the input shaft acceleration dωt/dt and the transmission output torque To.

On the other hand, in this embodiment, the control operation amounts for establishing the gear shift target values are set using three values including the turbine torque Tt (which has the same meaning as the engine torque Te), the engagement-side clutch torque Tcapl, and the disengagement-side clutch torque Tcdrn. Then, since the equations of motion include two equations of Equations (1) and (2) and there are three control operation amounts, the control operation amounts for establishing two gear shift target values do not have unique solutions. The output shaft acceleration dωo/dt in the equations is calculated from the transmission output shaft rotation speed ωo which is a value detected by the output shaft rotation speed sensor 83.

Therefore, whether the control operation amounts have unique solutions by adding limiting conditions to the equations of motion of Equations (1) and (2) has been studied. In this embodiment, torque assignment proportions of transmission torques assigned to the disengagement-side clutch and the engagement-side clutch are used as the limiting conditions which are suitable for expressing or controlling delivery of a torque during the gear shift and which can cope with any gear shift pattern. That is, the torque assignment proportions of a transmission torque which enable the delivery of a torque during the gear shift to be incorporated into the equations of motion and enable the control operation amounts to have unique solutions are set as the limiting conditions. The torque assignment proportions are proportions of the transmission torques at which a total transmission torque on the input shaft is assigned to both frictional engagement elements when the total transmission torque (a total transmission torque) which needs to be assigned to the disengagement-side clutch and the engagement-side clutch during the gear shift of the automatic transmission 3 is replaced with, for example, the torque on the input shaft 3a (the total transmission torque on the input shaft). In this embodiment, when the torque assignment proportion of the engagement-side clutch is defined as "xapl" and the torque assignment proportion of the disengagement-side clutch is defined as "xdm," Equations (3) and (4) are defined as follows using a torque assignment proportion x (for example, 0≤x≤1) varying in a time series to reflect the delivery of a torque during the gear shift.

$$xapl = x \quad (3)$$

$$xdrn = 1 - x \quad (4)$$

The relational expression between the engagement-side clutch torque Tcapl and the disengagement-side clutch torque Tcdrn can be defined using "x" (=xapl) and "1−x" (=xdm) based on "Tcapl" and "Tcdrn" replaced with the torque on the input shaft 3a and Equations (3) and (4). The relational expressions for calculating the turbine torque Tt, the engagement-side clutch torque Tcapl, and the disengagement-side clutch torque Tcdrn which are the control operation amounts are derived from Equations (1) and (2) and the relational expression between "Tcapl" and "Tcdrn." The turbine torque Tt (which has the same meaning as the engine torque Te) is expressed by a relational expression using "x" (=xapl), "1−x" (=xdrn), the input shaft acceleration dωt/dt, the transmission output torque To, and the like. Similarly, the engagement-side clutch torque Tcapl is expressed by a relational expression using "x" (=xapl), the input shaft acceleration dωt/dt, the transmission output torque To, and the like. Similarly, the disengagement-side clutch torque Tcdrn is expressed by a relational expression using "1−x" (=xdrn), the input shaft acceleration dωt/dt, the transmission output torque To, and the like.

That is, a gear shift model in this embodiment is for calculating the control operation amounts based on the gear shift target values using the equations of motion (Equations (1) and (2)) of the automatic transmission 3 including the gear shift target values and the control operation amounts and the relational expressions (Equations (3) and (4)) indicating the torque assignment proportions. In this way, in this embodiment, the gear shift of the automatic transmission 3 is executed using the gear shift model by adding the limiting conditions set with the torque assignment proportion x to Equations (1) and (2). Accordingly, even when three control operation amounts are present for two gear shift target values, three control operation amounts can be appropriately determined using the gear shift model. Since an equation of motion is individual but gear train equations of motion in which the constants differ depending on the gear shift type (for example, the gear shift pattern or the combination of shift stages between before and after the gear shift) are used as described above, the gear shift models corresponding to the gear shift types are used for the gear shift of the automatic transmission 3.

The operation of setting a target input shaft rotation speed change rate which is a feature of this embodiment will be described below. The operation of setting a target input shaft rotation speed change rate is an operation of setting the target value of the input shaft acceleration dωt/dt in Equation (1). In this embodiment, the operation of setting a target input shaft rotation speed change rate is performed when jump downshift control via a plurality of intermediate shift stages (for example, power-on jump downshift control) is executed.

The jump downshift control is control for executing a gear shift from a current shift stage to a shift stage lower by two or more steps, for example, at the time of a power-on jump downshift. For example, it is assumed that an accelerator pedal depression amount increases during traveling at the eighth shift stage, a shift stage difference of two or more steps occurs between a current shift stage and a required shift stage which is required depending on a driving condition, the required shift stage is set to, for example, the second shift stage, and the gear shift is executed. The jump downshift control via a plurality of intermediate shift stages is control for executing a gear shift to a required shift stage via two or more shift stages for the purpose of guaranteeing durability of the frictional engagement elements when the gear shift to the required shift stage is executed. For example, in a jump downshift form the eighth shift stage to the second shift stage, there is a likelihood that the clutch heat quantity will increase and durability of the frictional engagement elements will not be guaranteed when the jump gear shift (a single jump gear shift) is executed directly from the eighth shift stage to the second shift stage. There is room for improvement in that a variation in driving force at a gear shift end time or at a second shift stage synchronization time increases. Accordingly, it is conceivable that the gear shift is executed via the fifth shift stage as an intermediate shift stage between the eighth shift stage and the second shift stage. In this case, when there is concern that the clutch heat quantity will increase at the time of the gear shift from the fifth shift stage to the second shift stage, the gear shift is executed via the third shift stage as an additional intermediate shift stage between the fifth shift stage and the second shift stage. That is, the jump downshift control via a plurality of intermediate shift stages is for guaranteeing durability of the frictional engagement elements and decreasing the variation in driving force between before and after the gear shift to improve drivability by executing the gear shift via a plurality of intermediate shift stages.

In this way, when a jump gear shift via a plurality of intermediate shift stages is executed, an execution time for gear shift control from a first intermediate shift stage to a second intermediate shift stage is likely to decrease. At a gear shift control time before the gear shift to the second intermediate shift stage is started (at a time of gear shift control from the eighth shift stage to the fifth shift stage before the gear shift to the third shift stage is started in the above-mentioned example: this control is hereinafter referred to as first gear shift control), when a shifting time in the first gear shift control is very short, there is concern that packing of a clutch pack which is realized by supplying a hydraulic oil to a hydraulic oil pressure chamber of the frictional engagement elements which are engaged when the second intermediate shift stage (the third shift stage in the above-mentioned example) is set thereafter will not be executed in a timely manner and smooth gear shift will not be realized.

In this embodiment, when a jump gear shift via a plurality of intermediate shift stages is executed, a time required for preparation for engagement of the engagement-side frictional engagement elements is appropriately managed to realize a desired clutch torque in the engagement-side frictional engagement elements at a synchronous rotation speed of each shift stage (the synchronous rotation speed of the input shaft $3a$ of the automatic transmission 3). Specifically, this time is managed using a change per unit time of the input shaft rotation speed ωi (the input shaft rotation speed change rate (the input shaft acceleration dωt/dt)) of the automatic transmission 3.

Specifically, when a jump gear shift via a plurality of intermediate shift stages is executed, the target input shaft rotation speed change rate of a two-step gear shift is set based on a difference in synchronous rotation speed of the input shaft $3a$ between before and after the two-step gear shift from a gear shift with an intermediate shift stage as a target shift stage to a gear shift with a shift stage, which is a next target after the intermediate shift stage, as a target shift stage.

This setting operation is executed by the ECU 5. Accordingly, a functional portion that sets the target input shaft rotation speed change rate in the ECU 5 is constituted as a rotation speed change rate setting unit in the claims.

The operation of setting a target input shaft rotation speed change rate may be performed when jump upshift control via a plurality of intermediate shift stages (particularly, power-off jump upshift control) is performed. This is because both the power-on downshift and the power-off upshift require a high response in the gear shift operation with a change in the accelerator pedal depression amount and thus there is a likelihood that the shifting time in the first gear shift control will become very short and packing of the frictional engagement elements engaging when the second intermediate shift stage is set will not be executed in a timely manner as described above.

Figure 5:
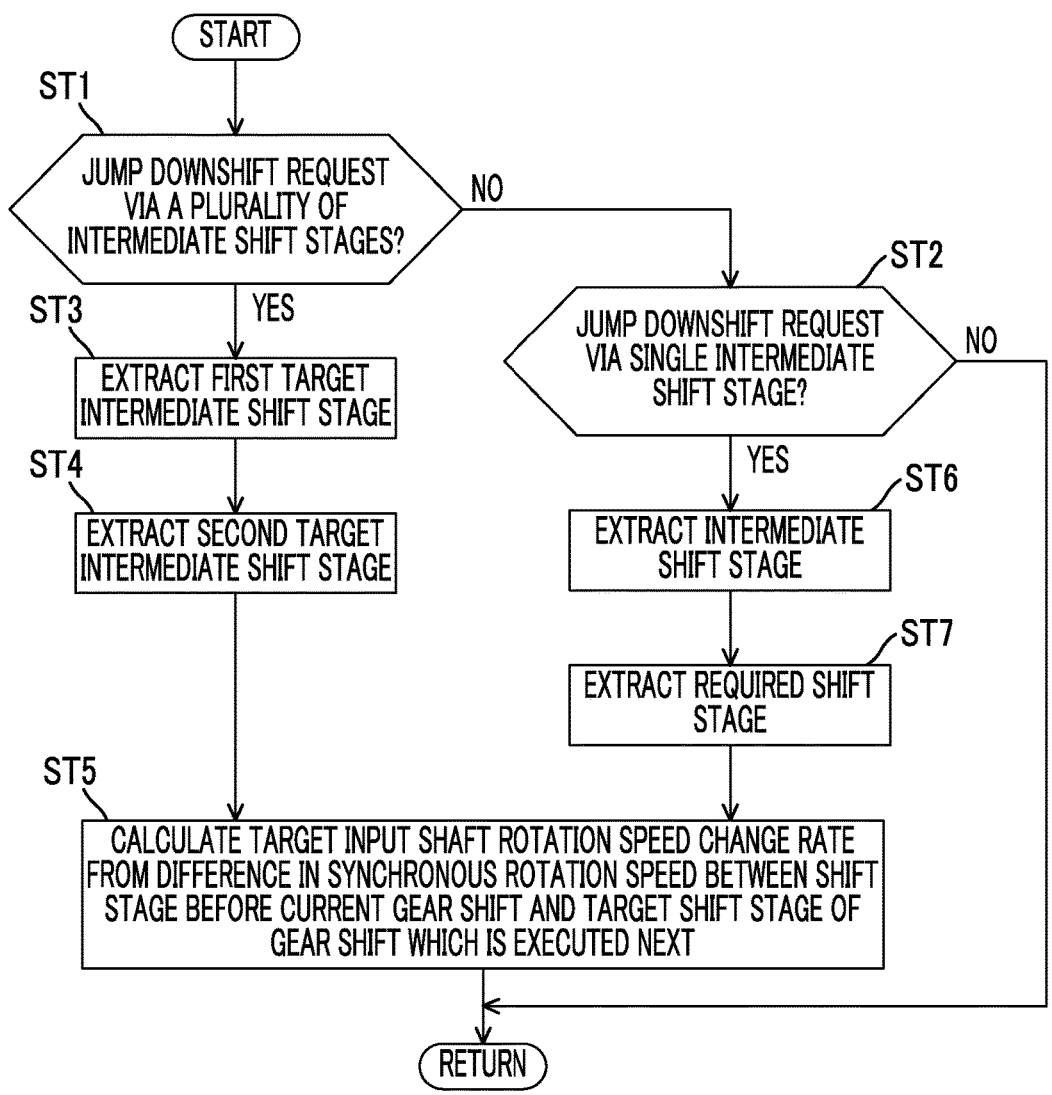
FIG. 5 is a flowchart illustrating a routine of an operation of setting a target input shaft rotation speed change rate according to the embodiment.

A routine of the operation of setting a target input shaft rotation speed change rate according to this embodiment will be described below with reference to the flowchart illustrated in FIG. 5. For the purpose of easy understanding of the disclosure, it is assumed that a jump gear shift request is a jump downshift request and a jump gear shift via a plurality of intermediate shift stages is executed via two intermediate shift stages. The flowchart illustrated in FIG. 5 is repeatedly performed at predetermined intervals after a start switch of the vehicle is turned on.

First, in Step ST1, it is determined whether a gear shift request of the automatic transmission 3 has been issued and the gear shift request is a jump downshift request via a plurality of intermediate shift stages. That is, it is determined whether a required shift stage which is set based on the gear shift map is a shift stage lower by three or more steps than a current shift stage and the gear shift to the required shift stage needs to be executed via a plurality of intermediate shift stages. An example of the jump downshift request via a plurality of intermediate shift stages is a case in which a downshift from the eighth shift stage to the second shift stage is requested by an increase in accelerator depression amount detected by the accelerator depression sensor 84 during the vehicle traveling at the eighth shift stage.

For each combination of shift stages between before and after a jump downshift, information on whether the gear shift needs to be executed via a plurality of intermediate shift stages is stored in advance in the ROM in consideration of the clutch heat quantity or the like as described above. When a jump downshift request occurs, it is determined whether the jump downshift needs to be executed via a plurality of intermediate shift stages with reference to the information stored in the ROM. The information on whether the gear shift needs to be executed via a plurality of intermediate shift stages, which is stored in the ROM, may be set depending on the combination of shift stages between before and after the jump downshift and the vehicle speed (which corresponds to the rotation speed of the output shaft $3b$ calculated based on the output signal of the output shaft rotation speed sensor 83). For example, when the combination of shift stages between before and after the gear shift is the same but the vehicle speed is equal to or higher than a predetermined value, it is determined that the gear shift needs to be executed via a plurality of intermediate shift stages. When the vehicle speed is lower than the predetermined value, it is determined that the gear shift does not need to be executed via a plurality of intermediate shift stages and has only to be executed via a single intermediate shift stage.

When the gear shift request is not a jump downshift request via a plurality of intermediate shift stages, that is, when the gear shift request is a jump downshift request via one or less intermediate shift stage, when the gear shift request of the automatic transmission 3 is an upshift request, when the gear shift request is a downshift request for changing only one shift stage, or when the gear shift request of the automatic transmission 3 does not occur, the determination result of Step ST is NO and the routine transitions to Step ST2.

In Step ST2, it is determined whether the gear shift request is a jump downshift request via a single intermediate shift stage. That is, it is determined whether the required shift stage set based on the gear shift map is a shift stage lower by two steps or more than the current shift stage and the gear shift to the required shift stage can be executed via a single intermediate shift stage. In this case, for each combination of shift stages between before and after the jump downshift, the information on whether the gear shift needs to be executed via a single intermediate shift stage is stored in advance in the ROM in consideration of the clutch heat quantity or the like as described above. When a jump downshift request occurs, it is determined whether the jump downshift via a single intermediate shift stage needs to be executed with reference to the information stored in the ROM. The information on whether the gear shift needs to be executed via a single intermediate shift stage, which is stored in the ROM, may be set depending on the combination of shift stages between before and after the jump downshift and the vehicle speed.

On the other hand, when it is determined in Step ST1 that the jump downshift request via a plurality of intermediate shift stages occurs, the determination result is YES and the routine transitions to Step ST3.

In Step ST3, a first target intermediate shift stage is extracted in executing the jump downshift via a plurality of intermediate shift stages. For example, when a downshift request from the eighth shift stage to the second shift stage occurs, the fifth shift stage is extracted as the first target intermediate shift stage.

In Step ST4, a second target intermediate shift stage is extracted. For example, when a downshift request from the eighth shift stage to the second shift stage occurs, the third shift stage is extracted as the second target intermediate shift stage.

In this way, information on the first target intermediate shift stage and the second target intermediate shift stage in executing the jump downshift via a plurality of intermediate shift stages is stored in advance in the ROM in consideration of the clutch heat quantity or the like as described above. When a jump downshift request via a plurality of intermediate shift stages occurs, the information on the first target intermediate shift stage and the second target intermediate shift stage corresponding to the combination of shift stages between before and after the gear shift is read from the ROM. In the information on the first target intermediate shift stage and the second target intermediate shift stage (information on the selected target intermediate shift stage) which is stored in the ROM, the target intermediate shift stages may be changed depending on the combination of shift stages between before and after the jump downshift and the vehicle speed.

Thereafter, in Step ST5, the target input shaft rotation speed change rate is calculated from the difference in synchronous rotation speed between the shift stage before the current gear shift and the target shift stage of a gear shift which is executed after the current gear shift. That is, when a downshift request from the eighth shift stage to the second shift stage occurs and the fifth shift stage and the third shift stage are extracted as the target intermediate shift stages, the target input shaft rotation speed change rate is calculated from the difference between the synchronous rotation speed of the input shaft 3*a* at the current vehicle speed at the eighth shift stage and the synchronous rotation speed of the input shaft 3*a* at the current vehicle speed at the third shift stage.

Specifically, the target input shaft rotation speed change rate for each combination of shift stages between before and after the gear shift and the target intermediate shift stages is calculated by experiment or simulation and is stored in advance in the ROM. When a jump downshift request via a plurality of intermediate shift stages occurs, the information on the target input shaft rotation speed change rate corresponding to the combination of shift stages between before and after the gear shift and the target intermediate shift stages is read from the ROM.

In the information on the target input shaft rotation speed change rate, as the time required for the packing becomes longer and the difference in synchronous rotation speed of the input shaft 3*a* becomes less, the target input shaft rotation speed change rate is set to be lower based on the time required for packing of the engagement-side frictional engagement elements when the target shift stage (the second target intermediate shift stage in the above-mentioned example) in the gear shift to the latter gear shift in the two-step gear shift is set and the difference in synchronous rotation speed of the input shaft 3*a* between before and after the two-step gear shift. The time required for the packing and the difference in synchronous rotation speed are determined based on dimensional data of the automatic transmission 3 or the like.

On the other hand, in Step ST2, it is determined whether the gear shift request is a jump downshift request via one intermediate shift stage as described above. An example of the jump downshift request via one intermediate shift stage is that the third shift stage is set as the intermediate shift stage when a downshift request from the fifth shift stage to the second shift stage occurs.

When the gear shift request is not a jump downshift request via an intermediate shift stage, that is, when the gear shift request of the automatic transmission 3 is an upshift request, when the required shift stage can be set by one instance of gear shift, or when no gear shift request of the automatic transmission 3 occurs, the determination result of Step ST2 is NO and the routine restarts. In this case, when the gear shift request is a gear shift request other than the jump downshift request via an intermediate shift stage, the target input shaft rotation speed change rate stored in advance in the ROM is extracted and gear shift control at the target input shaft rotation speed change rate is performed. Specifically, the target input shaft rotation speed change rate in this case is read from an input shaft rotation speed change rate map stored in the ROM. The input shaft rotation speed change rate map is a map in which change modes of the input shaft rotation speed change rate (the input shaft acceleration d$\omega$t/dt) are defined. The input shaft rotation speed change rate map is determined in advance such that the turbine rotation speed $\omega$t can be changed in an inertia phase while both reduction of a gear shift shock and shortening of a shifting time can be achieved.

On the other hand, when the jump downshift request via one intermediate shift stage occurs, the determination result of Step ST2 is YES and the routine transitions to Step ST6.

In Step ST6, a target intermediate shift stage is extracted in executing the jump downshift via one intermediate shift stage. For example, when a downshift request from the fifth shift stage to the second shift stage occurs, the third shift stage is extracted as the intermediate shift stage.

In Step ST7, the required shift stage is extracted. For example, when the downshift request from the fifth shift stage to the second shift stage occurs, the second shift stage is extracted as the required shift stage (a target shift stage in this gear shift).

The information on the intermediate shift stage in executing the jump downshift via one intermediate shift stage in this way is stored in advance in the ROM in consideration of the clutch heat quantity or the like as described above. When a jump downshift request via one intermediate shift stage occurs, the information on the intermediate shift stage corresponding to the combination of shift stages between before and after the gear shift is read from the ROM.

Thereafter, in Step ST5, in the same way as described above, the target input shaft rotation speed change rate is calculated from the difference in synchronous rotation speed between the shift stage before the current gear shift and the target shift stage in the gear shift which is executed after the current gear shift. That is, when a downshift request from the fifth shift stage to the second shift stage occurs and the third shift stage is extracted as the intermediate shift stage, the target input shaft rotation speed change rate is calculated from the difference between the synchronous rotation speed at the current vehicle speed at the fifth shift stage and the synchronous rotation speed at the current vehicle speed at the second shift stage.

In this case, in the same way as described above, the target input shaft rotation speed change rate for each combination of shift stages between before and after the gear shift and the intermediate shift stage is calculated by experiment or simulation and is stored in advance in the ROM. When a jump downshift request via an intermediate shift stage occurs, the information on the target input shaft rotation speed change rate corresponding to the combination of the shift stages between before and after the gear shift and the intermediate shift stage is read from the ROM.

In the information on the target input shaft rotation speed change rate, as the time required for the packing becomes longer and the difference in synchronous rotation speed of the input shaft $3a$ becomes less, the target input shaft rotation speed change rate is set to be lower based on the time required for packing of the engagement-side frictional engagement elements when the target shift stage (the required shift stage in the above-mentioned example) in the gear shift to the latter gear shift in the two-step gear shift is set and the difference in synchronous rotation speed of the input shaft $3a$ between before and after the two-step gear shift.

The above-mentioned operation is repeatedly performed at predetermined intervals.

In this way, the target input shaft rotation speed change rate is set and the set target input shaft rotation speed change rate is applied as a target value of the input shaft acceleration $d\omega t/dt$ in Equation (1). By solving the equations of motion of Equations (1) and (2), the turbine torque Tt, the engagement-side clutch torque Tcapl, and the disengagement-side clutch torque Tcdrn which are the control operation amounts are calculated and the gear shift control to a target shift stage (gear shift control with an intermediate shift stage as a target shift stage or gear shift control with the required shift stage as a target shift stage) is executed.

As described above, in this embodiment, when a jump gear shift via a plurality of intermediate shift stages is executed, the target input shaft rotation speed change rate of the two-step gear shift is set based on the difference in synchronous rotation speed of the input shaft $3a$ between before and after the two-step gear shift from the gear shift with the intermediate shift stage as a target shift stage to the gear shift with the shift stage, which is a next target shift stage after the intermediate shift stage, as a target shift stage for each intermediate shift stage. Accordingly, it is possible to avoid a situation in which the shifting time in the gear shift control to the intermediate shift stage becomes very short and the packing of the frictional engagement elements which are engaged when the intermediate shift stage is set is not executed in a timely manner. That is, it is possible to appropriately manage the time required for preparation for realization of a desired clutch torque by the engagement-side frictional engagement elements at the synchronous rotation speed of the intermediate shift stage. Accordingly, it is possible to realize a smooth gear shift operation.

More specifically, in this embodiment, as the time required for the packing (the time required for the packing of the frictional engagement elements which are engaged when a target shift stage is set) becomes longer and the difference in synchronous rotation speed of the input shaft $3a$ (the difference in synchronous rotation speed of the input shaft $3a$ between before and after the two-step gear shift) becomes less, the target input shaft rotation speed change rate is set to be lower. When the target input shaft rotation speed change rate is set to be constant regardless of the time required for the packing or the difference in synchronous rotation speed of the input shaft $3a$, the shifting time becomes shorter than the time required for the packing and the likelihood that the packing will not be performed in a timely manner becomes higher, as the time required for the packing becomes longer and the difference in synchronous rotation speed of the input shaft $3a$ becomes less. On the other hand, in this embodiment, as the time required for the packing becomes longer and the difference in synchronous rotation speed of the input shaft $3a$ becomes less, the target input shaft rotation speed change rate is set to be lower and it is thus possible to prevent the shifting time in the gear shift control to the former gear shift in the two-step gear shift from becoming very short. Accordingly, it is possible to avoid a situation in which the packing of the engagement-side frictional engagement elements when the target shift stage in the gear shift to the latter gear shift is set is not executed in a timely manner. As a result, it is possible to realize a smooth gear shift operation.

Figure 6:
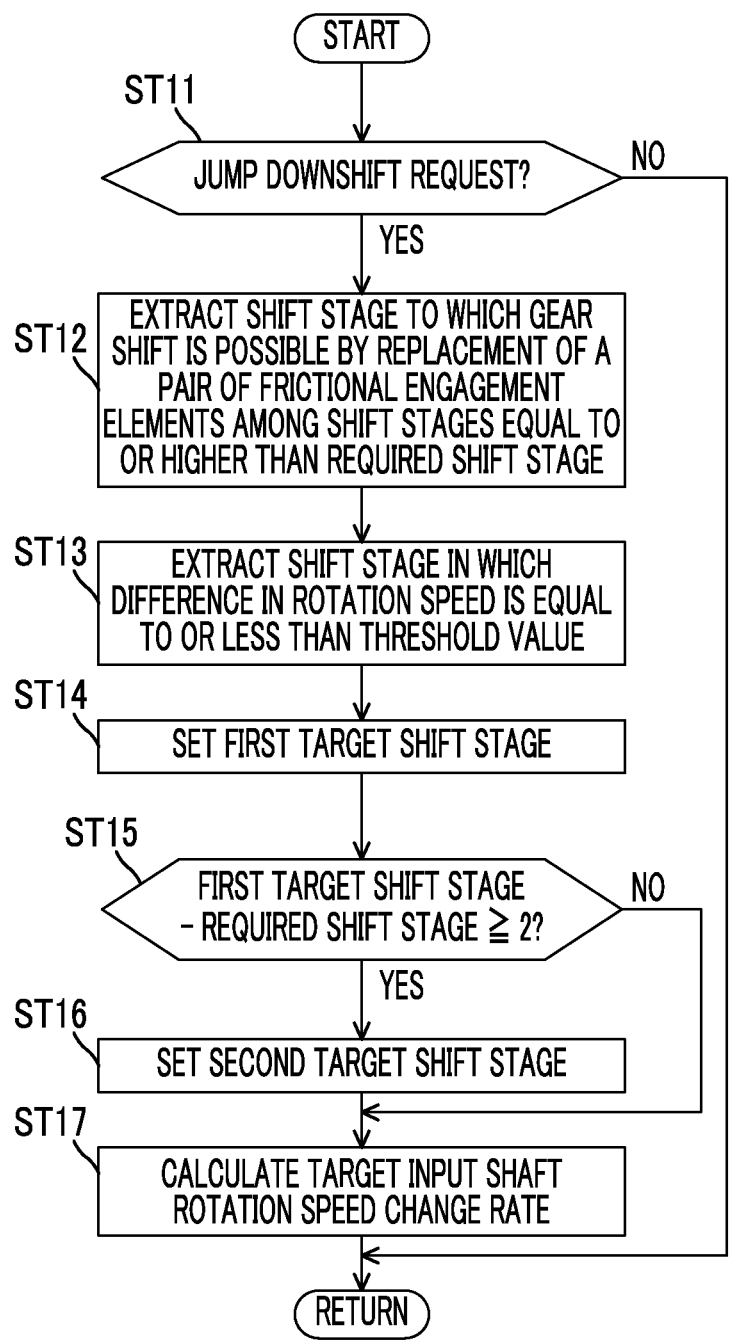
FIG. 6 is a flowchart illustrating a routine of an operation of setting a target input shaft rotation speed change rate according to a modified example of the embodiment.

A modified example of this embodiment will be described below. FIG. 6 is a flowchart illustrating a routine of jump downshift control according to the modified example. This flowchart is repeatedly performed at predetermined intervals after a start switch of the vehicle is turned on.

First, in Step ST11, it is determined whether a gear shift request of the automatic transmission 3 occurs and the gear shift request is a jump downshift request. That is, it is determined whether a required shift stage set based on the gear shift map is a shift stage lower by two or more steps than a current shift stage.

When a jump downshift request does not occur, that is, when the gear shift request of the automatic transmission 3 is an upshift request, when the gear shift request is a downshift request for changing only one shift stage, or when the gear shift request of the automatic transmission 3 does not occur, the determination result of Step ST11 is NO and the routine restarts.

On the other hand, when a jump downshift request occurs and the determination result of Step ST11 is YES, the routine transitions to Step ST12 and a shift stage to which the gear shift is possible by replacement of a pair of frictional engagement elements is extracted among shift stages equal to or higher than the shift stage required by the jump downshift (the required shift stage) (shift stages lower than the current shift stage and equal to or higher than the required shift stage)

Specifically, when a downshift request from the eighth shift stage to the second shift stage occurs, a shift stage to which the gear shift is possible by replacement of a pair of frictional engagement elements in a downshift from the eighth shift stage to the seventh shift stage, a downshift from the eighth shift stage to the sixth shift stage, a downshift from the eighth shift stage to the fifth shift stage, a downshift from the eighth shift stage to the fourth shift stage, a downshift from the eighth shift stage to the third shift stage, and a downshift from the eighth shift stage to the second shift stage is extracted. In this case, since the downshift from the eighth shift stage to the seventh shift stage, the downshift from the eighth shift stage to the sixth shift stage, the downshift from the eighth shift stage to the fifth shift stage, and the downshift from the eighth shift stage to the second shift stage is possible by replacement of a pair of frictional engagement elements, the seventh shift stage, the sixth shift stage, the fifth shift stage, and the second shift stage are extracted.

Thereafter, in Step ST13, among the extracted shift stages, a shift stage in which the difference in synchronous rotation speed of the input shaft 3a between before and after the gear shift, that is, the difference in synchronous rotation speed of the input shaft 3a before and after the gear shift when it is assumed that a gear shift from the shift stage before the gear shift to the extracted shift stage has been executed, is equal to or less than a predetermined threshold value is extracted. The threshold value used in this case is a difference in rotation speed when the heat quantity generated due to sliding of friction materials of the frictional engagement elements (the clutch heat quantity) reaches an upper limit of an allowable heat quantity and is set in advance by experiment or simulation. The difference in rotation speed can be calculated based on a combination of shift stages between before and after the downshift and the current vehicle speed.

Specifically, when the difference in rotation speed in the downshift from the eighth shift stage to the second shift stage is greater than the threshold value and the differences in rotation speed in the downshift from the eighth shift stage to the seventh shift stage, the downshift from the eighth shift stage to the sixth shift stage, and the downshift from the eighth shift stage to the fifth shift stage are equal to or less than the threshold value, the seventh shift stage, the sixth shift stage, and the fifth shift stage are extracted in Step ST13.

Thereafter, in Step ST14, a first target shift stage is set among the shift stages extracted in Step ST13. For example, the fifth shift stage closer to the required shift stage among the seventh shift stage, the sixth shift stage, and the fifth shift stage which have been extracted is set as the first target shift stage. Here, the sixth shift stage or the seventh shift stage may be set as the first target shift stage. The first target shift stage which is set in Step ST14 may be the same as the required shift stage.

The operation of Steps ST12 to ST14 corresponds to the operation of a first target shift stage extracting unit in the claims (the operation of extracting as a first target shift stage a shift stage to which a gear shift is possible by replacement of a pair of frictional engagement elements when the gear shift is executed from a current shift stage and in which the difference in transmission input shaft rotation speed between before and after the gear shift when it is assumed that the gear shift has been executed is equal to or less than a predetermined threshold value among shift stages which are lower than the current shift stage and equal to or higher than the required shift stage, when a jump downshift is executed as a jump gear shift via a plurality of intermediate shift stages).

Thereafter, in Step ST15, it is determined whether a value obtained by subtracting the stage number of the required shift stage from the stage number of the set first target shift stage is equal to or greater than 2. That is, it is determined whether the first target shift stage and the required shift stage are not shift stages which do not neighbor each other (shift stages different by one step) or are not the same shift stage and a shift stage which may serve as an intermediate shift stage (a second target shift stage) is present between the first target shift stage and the required shift stage.

When the value obtained by subtracting the stage number of the required shift stage from the stage number of the set first target shift stage is less than 2 and the determination result of Step ST15 is NO, the routine transitions to Step ST17 and the target input shaft rotation speed change rate is calculated. Specifically, the target input shaft rotation speed change rate is calculated from the difference in synchronous rotation speed between the shift stage before the gear shift and the required shift stage. That is, when a downshift request from the eighth shift stage to the fifth shift stage occurs and the sixth shift stage is set as an intermediate shift stage, the target input shaft rotation speed change rate is calculated from the difference between the synchronous rotation speed of the input shaft 3a at the current vehicle speed at the eighth shift stage and the synchronous rotation speed of the input shaft 3a at the current vehicle speed at the fifth shift stage.

On the other hand, when the value obtained by subtracting the stage number of the required shift stage from the stage number of the set first target shift stage is equal to or greater than 2 and the determination result of Step ST15 is YES, the routine transitions to Step ST16 and an operation of setting a second target shift stage is performed. The operation of setting the second target shift stage is performed in the same way as the above-mentioned operation of setting the first target shift stage. That is, the second target shift stage is set by the operation of Step ST12 (extracting a shift stage to which the gear shift is possible by replacement of a pair of frictional engagement elements among the shift stages (the shift stages lower than the first target shift stage and equal to or higher than the required shift stage) equal to or higher than the shift stage required for the jump downshift) and the operation of Step ST13 (extracting a shift stage in which the difference in rotation speed of the input shaft 3a between before and after the gear shift, that is, the difference in rotation speed of the input shaft 3a between before and after the gear shift when it is assumed that the gear shift from the shift stage before the gear shift to the extracted shift stage has been executed, is equal to or less than a predetermined threshold value among the extracted shift stages). The second target shift stage may be equal to the required shift stage.

The operation of Step ST16 corresponds to the operation of a second target shift stage extracting unit in the claims (the operation of extracting as a second target shift stage a shift stage to which a gear shift is possible by replacement of a pair of frictional engagement elements when the gear shift is executed from the first target shift stage and in which the difference in transmission input shaft rotation speed between before and after the gear shift when it is assumed that the gear shift has been executed is equal to or less than a predetermined threshold value among shift stages which are lower than the first target shift stage and equal to or higher than the required shift stage).

After the first target shift stage and the second target shift stage are set in this way, the target input shaft rotation speed change rate is calculated in Step ST17. Specifically, the target input shaft rotation speed change rate is calculated from the difference in synchronous rotation speed between the shift stage before the gear shift and the second target shift stage. That is, when a downshift request from the eighth shift stage to the second shift stage occurs, the fifth shift stage is set as the first target shift stage, and the third shift stage is set as the second target shift stage, the target input shaft rotation speed change rate is calculated from the difference between the synchronous rotation speed of the input shaft 3a at the current vehicle speed at the eighth shift stage and the synchronous rotation speed of the input shaft 3a at the current vehicle speed at the third shift stage.

The above-mentioned operation is repeatedly performed at predetermined intervals.

In this modified example, the target input shaft rotation speed change rate set as described above is applied as a target value of the input shaft acceleration dωt/dt in Equation (1). By solving the equations of motion of Equations (1) and (2), the turbine torque Tt, the engagement-side clutch torque Tcapl, and the disengagement-side clutch torque Tcdrn which are the control operation amounts are calculated and the gear shift control to each target shift stage (gear shift control with an intermediate shift stage as a target shift stage or gear shift control with a required shift stage as a target shift stage) is executed.

In this modified example, similarly to the above-mentioned embodiment, it is possible to avoid a situation in which the shifting time in the gear shift control to the intermediate shift stage becomes very short and the packing of the frictional engagement elements which are engaged when the intermediate shift stage is set is not executed in a timely manner. That is, it is possible to appropriately manage the time required for preparation for realization of a desired clutch torque by the engagement-side frictional engagement elements at the synchronous rotation speed of the intermediate shift stage. Accordingly, it is possible to realize a smooth gear shift operation.

The above-mentioned embodiment and modified example are exemplary in all respects and does not serve as a basis of restrictive analysis. Therefore, the technical scope of the disclosure is not limited to only the above-mentioned embodiment and modified example, but is defined by the description of the appended claims. The technical scope of the disclosure includes all modifications within a meaning and a range equivalent to the claims.

The above-mentioned embodiment and modified example describe an example in which the vehicle 100 is of an FF type. However, the disclosure is not limited thereto and the vehicle may be of a front engine-rear drive (FR) type or of a four-wheel driven type.

The target input shaft rotation speed change rate may be set to depend on a target input shaft rotation speed which can be set in a time series or a change rate of a target degree of process in gear shift.

The target input shaft rotation speed change rate may be indirectly set depending on a difference in rotation speed of the input shaft 3a between before and after the gear shift and a target shifting time.

The jump downshift via an intermediate shift stage which has been mentioned above includes an overlap gear shift in which a single downshift (a one-step downshift) is continuously executed in a broad sense.

In the above-mentioned embodiment and the above-mentioned modified example, a case in which the power-on jump downshift control via two intermediate shift stages is performed has been described above. The disclosure is not limited thereto, and can be applied to a case in which power-on jump downshift control via three or more intermediate shift stages is performed. As described above, the disclosure can be applied to a case in which power-off jump upshift control is performed.

The disclosure can be used for a controller for a stepped type automatic transmission which is mounted in a vehicle and which can execute a jump gear shift via an intermediate shift stage.

What is claimed is:

1. A controller for a stepped automatic transmission that includes a plurality of frictional engagement elements that are each selectively switched between engaged and disengaged states to selectively establish a plurality of shift stages, the controller comprising:
    an electronic control unit configured to:
        (i) set a target input shaft rotation speed change rate of an input shaft to the stepped automatic transmission as a control target value at a gear shift time, and
        (ii) when a gear shift operation that is to occur at the gear shift time is a jump gear shift in which, based on a driving condition of a vehicle in which the transmission is installed, a current shift stage of the plurality of shift stages is switched to a target shift stage of the plurality of shift stages that is at least three shift stages greater or less than the current shift stage, by first switching to a first intermediate shift stage that is between the current shift stage and the target shift stage, and subsequently switching to a second intermediate shift stage that is between the first intermediate shift stage and the target shift stage, before switching to the target shift stage, set the target input shaft rotation speed change rate to a value that is based on a difference between (1) a synchronous rotation speed of the input shaft at the current shift stage and (2) the synchronous rotation speed of the input shaft at the second intermediate shift stage.

2. The controller according to claim 1, wherein
    the electronic control unit is configured to: when the electronic control unit executes a jump downshift as the jump gear shift,
        (i) select, as the first intermediate shift stage, one of the plurality of shift stages which is lower than the current shift stage and higher than the target shift stage, and that is achieved by replacement of a single one of the frictional engagement elements when switching from the current shift stage to the first intermediate shift stage, and a difference in the synchronous rotation speed of the input shaft between the current shift stage and the first intermediate shift stage is equal to or less than a predetermined threshold value; and
        (ii) select as the second intermediate shift stage, another one of the plurality of shift stages which is lower than the first intermediate shift stage and higher than the target shift stage, and that is achieved by replacement of a single one of the frictional engagement elements when switching from the first intermediate shift stage to the second intermediate shift stage, and a difference in the synchronous rotation speed of the input shaft between the first intermediate shift stage and the second intermediate shift stage is equal to or less than the predetermined threshold value.

3. The controller according to claim 1, wherein
the electronic control unit is configured to set the target input shaft rotation speed change rate to be lower as a time required for packing of a clutch pack becomes longer, and the packing of the clutch pack is realized by supplying a hydraulic oil to a hydraulic oil pressure chamber of an engagement-side frictional engagement element, which is one of the frictional engagement elements that is engaged upon completion of the gear shift operation.

4. The controller according to claim 1, wherein
the electronic control unit is configured to set the target input shaft rotation speed change rate to be lower as the difference between (1) the synchronous rotation speed of the input shaft at the current shift stage and (2) the synchronous rotation speed of the input shaft at the second intermediate shift stage becomes smaller.

* * * * *